(12) United States Patent  
Roto et al.

(10) Patent No.: US 7,716,580 B2  
(45) Date of Patent: May 11, 2010

(54) WEB PAGE TITLE SHORTENING

(75) Inventors: Virpi Roto, Espoo (FI); Elina Vartiainen, Helsinki (FI); Andrei Popescu, Helsinki (FI); Guido Grassel, Espoo (FI); Salla Myllyia, Helsinki (FI); Mika Rautava, Espoo (FI)

(73) Assignee: Nokia Corporation, Espoo (FI)

( * ) Notice: Subject to any disclaimer, the term of this patent is extended or adjusted under 35 U.S.C. 154(b) by 1034 days.

(21) Appl. No.: 11/171,508

(22) Filed: Jun. 30, 2005

(65) Prior Publication Data

US 2007/0006074 A1 Jan. 4, 2007

(51) Int. Cl.  
*G06F 17/00* (2006.01)

(52) U.S. Cl. .................. 715/256; 715/206; 715/207

(58) Field of Classification Search .......... 715/206, 715/207, 254, 256  
See application file for complete search history.

(56) References Cited

U.S. PATENT DOCUMENTS

| | | | | |
|---|---|---|---|---|
| 7,251,775 B1 * | 7/2007 | Astala et al. | ........ | 715/205 |
| 2005/0262431 A1 * | 11/2005 | Sauermann | ........ | 715/508 |
| 2007/0288866 A1 * | 12/2007 | Ur et al. | ........ | 715/816 |

OTHER PUBLICATIONS

Ayers, Eric Z. and John T. Stasko, Using Graphic History in Browsing the World Wide Web, th International World Wide Web Conference, www.w3.org/Conferences/WWW4/Program_Full.html ftp://ftp.cc.gatech.edu/pub/gvu/tr/1995/95-12.ps.Z.*  
Chang, E., H. Meng, Y. Li & T. Fung, 2002. Efficient web search on mobile devices with multi-modal input and intelligent text summarization. In Proceedings of the eleventh international World Wide Web conference, Honolulu, Hawai,USA, May. http://www2002.org/CDROM/poster/190.pdf.*

* cited by examiner

*Primary Examiner*—Adam M Queler  
(74) *Attorney, Agent, or Firm*—Alston & Bird LLP (57) ABSTRACT

A method for shortening a web page title. The method includes determining if a title of a current web page fits in a title display area of a display. If the title fits the title is displayed in the title area. If the title does not fit, it is determined if the title of the current web page starts with a same word as a title of a previous page. If the title of the current web page starts with the same word, at least one word is removed from a beginning portion of the title of the current page that is in common with the title of the previous page, until the title of the current page fits in the title display area, or there are no more common words in the beginning of the title. End words or letters or end words can be removed until the title fits. Missing words may be indicated by adding a predetermined indicator in the area of the missing or removed words.

20 Claims, 8 Drawing Sheets

WEB PAGE TITLE SHORTENING

BACKGROUND OF THE INVENTION

1. Field of the Invention

The present invention is generally related to web browsers and browser user interfaces displaying information related to web pages and or wireless application protocol ("WAP") pages, and in particular to displaying title information of a web page or WAP page.

2. Background of the Invention

Web pages may often have titles that indicate their location in the web site. The main page of a web site has a main title, for example "BBC News", and sub-pages add to this title, for example "BBC News | Health". The deeper a web page is located within a web site, the longer the corresponding title. Long web page titles are problematic to show on small screens. Devices with a limited screen size and small display size may have a problem showing a longer title, as only a few words from the beginning of the title will fit to the screen. If the user has browsed the pages of the same site right before the current page, the beginning of the page title becomes irrelevant, and the end of the title is the more important one to see. The existing solutions related to displaying long titles tend to show as many words from the beginning of the title and indicate remaining words by adding ". . . " to the end of the title. The user thus has a hard time to identify the pages based on the partial page title e.g. when, for example, the user steps back to previous pages via a history list where the page titles are shown or viewing a page with the partial page title visible.

Browsers such as Opera and Internet Explorer ("IE") show as many words from the beginning of the page title as possible, and indicate the remaining words by adding ". . ." to the end of the title. These, and other browsers, do not try to shorten the title in any other way.

Ayers et al. define, in their paper entitled "Using Graphic History in Browsing the World Wide Web", a title-shortening algorithm that tries to preserve whole words in the title so the abbreviated title will make sense. Ayers also tries to preserve whole words at either end of the title. Ayers builds the abbreviated title back and forth from the beginning and end of the title, adding as many whole words as will fit at either end, and then adding characters to the title until the length of the title fills the width allotted for the node.

Chang et al. describe, in their paper entitled "Efficient Web Search on Mobile Devices with Multi-Modal Input and Intelligent Text Summarization", a title-shortening algorithm that consists of two techniques: the use of abbreviation and automatic insignificant words removal.

It would be helpful to be able to account for the titles of pages already visited and account for the browsing history of the user, rather than shorten each page title individually without investigating the relationship of the current page to the other pages visited.

SUMMARY OF THE INVENTION

In one aspect, the present invention is directed to a method for shortening a web page title. In one embodiment the method includes determining if a title of a current web page fits in a title display area of a display. If the title fits the title is displayed in the title area. If the title does not fit, it is determined if the title of the current web page starts with a same word as a title of a previous page. If the title of the current web page starts with the same word, words are removed from a beginning portion of the title of the current page that is in common with the title of the previous page, until the title of the current page fits in the title display area, or until there are no more common words in the beginning of the page title. Missing words are indicated by adding a predetermined indicator to the beginning portion of the title. If the unique part of the page title still does not fit the title display area, words or letters are removed from the end of the title until the title is short enough to fit to the display area. A predetermined indicator may be added to the end of the visible portion of the page title as an indicator of removed words or letters.

In another aspect, the present invention is directed to a method of shortening a web page title to fit a screen of a display. In one embodiment, the method includes comparing a current web page title with a previous web page title; removing as many common words from a beginning of the current web page title as needed until the current web page title fits the screen of the display; and indicating any missing words by adding an indicator to the beginning of the web page title.

In a further aspect the present invention is directed to a computer program product. In one embodiment, the computer program product comprises a computer useable medium having computer readable code means embodied therein for causing a computer to shortening a web page title, the computer readable code means in the computer program product comprising computer readable program code means for causing a computer to determine if a title of a current web page fits in a title display area of a display and if the title fits, displaying the title in the title area; computer readable program code means for causing a computer to determine if the title of the current web page starts with a same word as a title of a previous page; computer readable program code means for causing a computer to, if the title of the current web page starts with the same word, remove at least one word from a beginning portion of the title of the current page that is in common with the title of the previous page until the title of the current page fits in the title display area.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(s)

Figure 1:
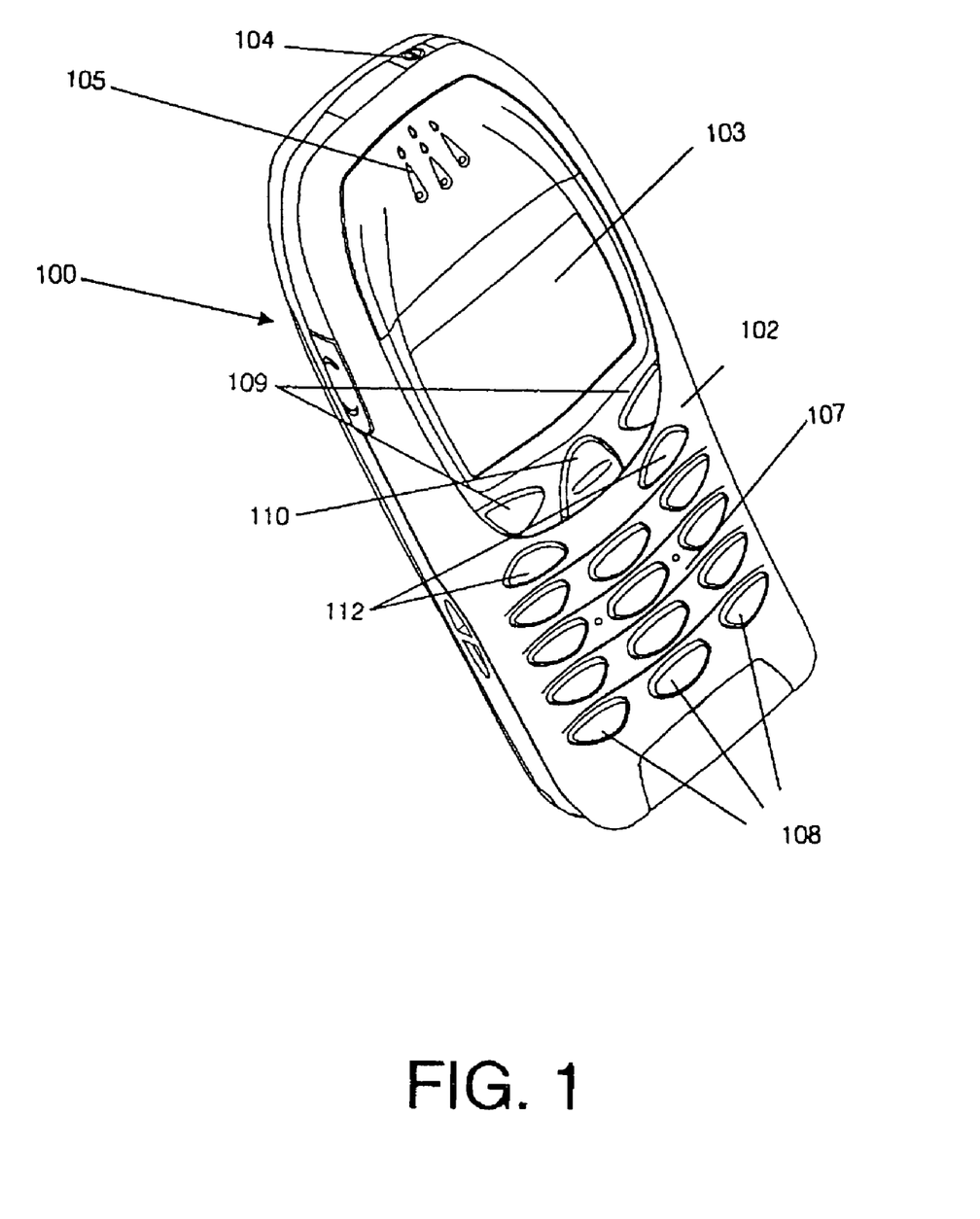
FIG. 1 is one embodiment of a device that can be used to practice the present invention.

Referring to FIG. 1, a perspective view of a system 100 incorporating features of the disclosed embodiments is illustrated. Although the embodiments disclosed will be described with reference to the embodiments shown in the drawings, it should be understood that the embodiments disclosed can be embodied in many alternate forms of embodiments. In addition, any suitable size, shape or type of elements or materials could be used.

The present invention generally relates to shortening a web page title to fit on the screen or a display 103, or a devise 100, such as that shown in FIG. 1. Long web page titles are problematic to shown on small screens, such as the display 103 shown in FIG. 1. As shown in FIG. 1 the device 100 generally includes a housing 102 on which elements of the user interface of the device 100 can be arranged. The user interface generally includes a keypad 107, the display 103, an on/off button 104, a speaker 105 and a microphone 106. On one embodiment, the device 100 is adapted for communication and data transfer via a cellular network. The embodiments of the present invention generally apply to Internet usage on a variety of devices, including for example, browsers running on a desktop computer, personal organizers with wireless connections ("PDA") and mobile handheld devices and telephones. The display 103 is suitably sized for the size of the device 100.

When a web page title does not fit the display area reserved for showing the title, the disclosed embodiments will compare the title of the current web page being viewed or displayed to the title of the previously visited page. A common word or words from the beginning of the title can be removed until the title fits the display area. If needed, an end word or words, or even a letter or letters of an end word can be removed until the title fits. The changed part of the title can be indicated by a pre-determined indicator or indicators. This way, the most relevant part of the title is shown, even when there is limited space to show the title.

The term "word" generally includes any set or group of characters that might be found in a title. The term "letter" is generally meant to include any character, including a text character, letter of the alphabet, numeric character, or grammatical character.

Figure 2:
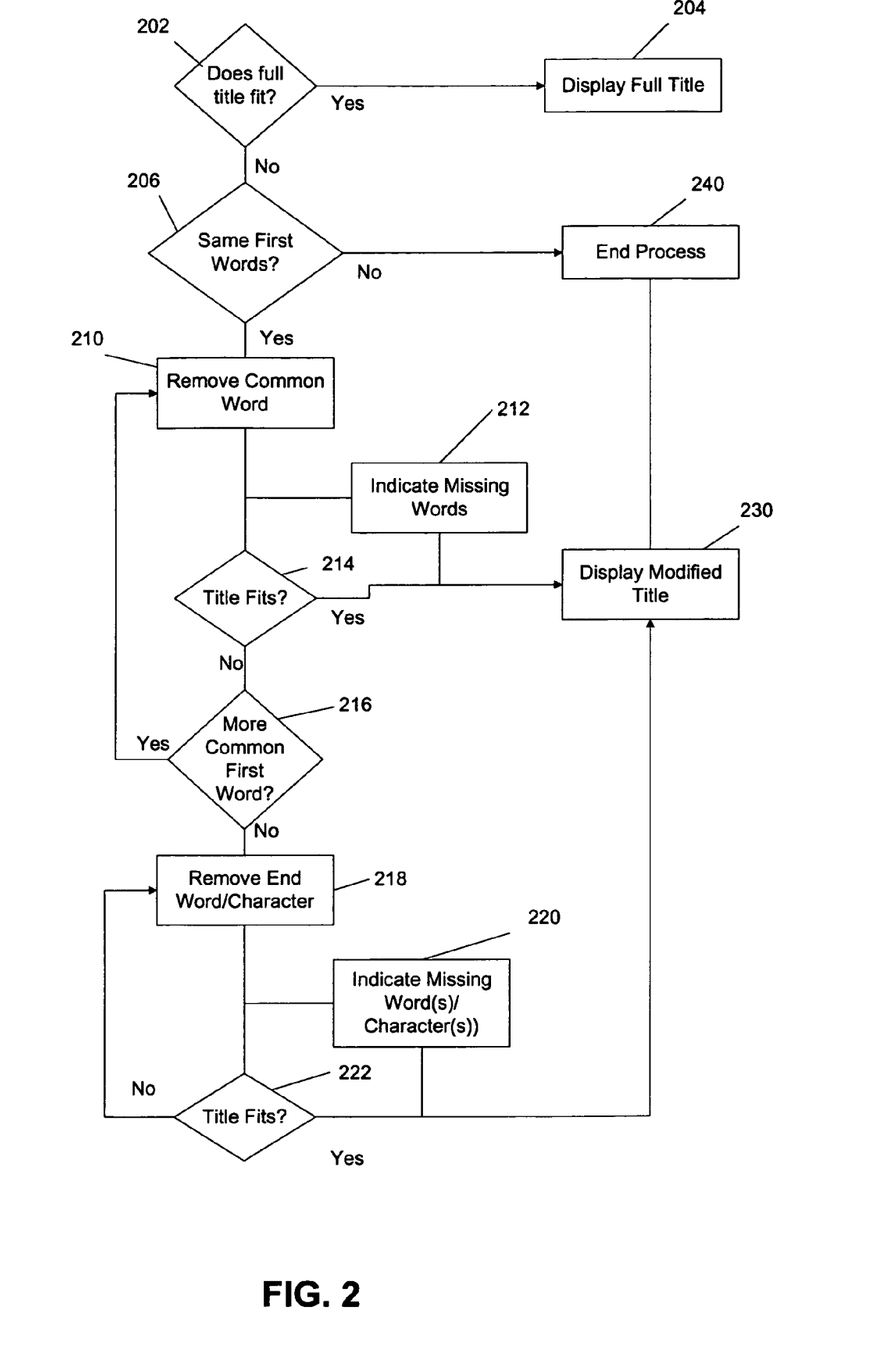
FIG. 2 is a flowchart of one embodiment of a method incorporating features of the present invention.

Referring to FIG. 2, one embodiment of a method incorporating features of the present invention is illustrated. When a web page is accessed, it is determined 202 if the title of the web page will fit to the screen of the display of the particular device that is used to display the web page. If the title of the web page suitably adapts or fits to the screen size of the display 103 of the device 100 for example, the title as a whole can be displayed 204.

However if the full title of the web page does not fit to the screen, it is determined 206 if the title of the current web page starts with the same or a common word as the title of the prior web page that has been visited or accessed by the user. This can include reviewing or searching the browser history of the user. For example, in one embodiment, the "history" function or feature of the particular browser is accessed and search for the most recently visited web page. The searching could be limited by predetermined parameters, such as for example date and time. For example, if a user has not accessed or visited a web page within a pre-determined period of time, such as day, it might be considered that there is no previous web page. The pre-determined criteria could be a function if the user wishes the present invention to be applied to current or stale data.

If there is no previous page, or if the current page does not start with the same or a common word, the title shortening process can be aborted 240 and another suitable method can be used to fit the most relevant part of the title to the screen or shorten the title.

In the situation where the title of the current page starts with the same word or words as the title of the previous page, as many common words between the beginning sections or portions are removed 210, as may be needed, from the title to be displayed, to enable the modified title to fit to the screen as well as possible. In one embodiment, one word is removed and it is determined if the title now fits. If not, another common word at the beginning portion can be removed. In one embodiment, any missing words can be indicated 212 by any suitable indicator or icon. This can include inserting one indicator to represent the missing word or words. In one embodiment the indicator could comprise for example, punctuation marks, such as ". . . ". The indicator would be placed at the beginning section of the title from where the word or words were removed.

After a common word is removed 210, it is determined if the modified title fits, or can be displayed 214. If so, the modified title is displayed 230 and the process ends. If the title does not fit, it is determined if there are any more common words 216. If so, another common word is removed 210. In one embodiment, the indication step 212 can take place after all needed words are removed and the title is determined to fit. It is not necessary to insert an indicator for each missing word, although this can be done if desired. In the exemplary embodiment, a single indicator is inserted after the removal step(s) is complete.

If, after all common words are removed from the beginning portion of the title, the title is still to long or large for the screen display area, an end word or letter of an end word is removed 218 from an end portion of the title. The removed end letter is indicated 220 by any suitable indicator, such as for example punctuation marks ". . . ". Generally, the indication of a removed letter is only added once, and not after the removal of each word. Thus, the indicator could be added after the removal of the first word or letter or after the removal of the last word or letter. In one embodiment, the indicator may only be added after it is determined the title fits in the display area.

If the title does not fit 222, another end word or letter is removed 218. This process, 218-222, can continue until the title fits to the screen size and display area. If the title does fit 222, the modified title is displayed 230 and the process ends 240.

For example, referring to FIGS. 3 through 6, each figure illustrates a web page in an order in which the web page was visited.

Figure 3:
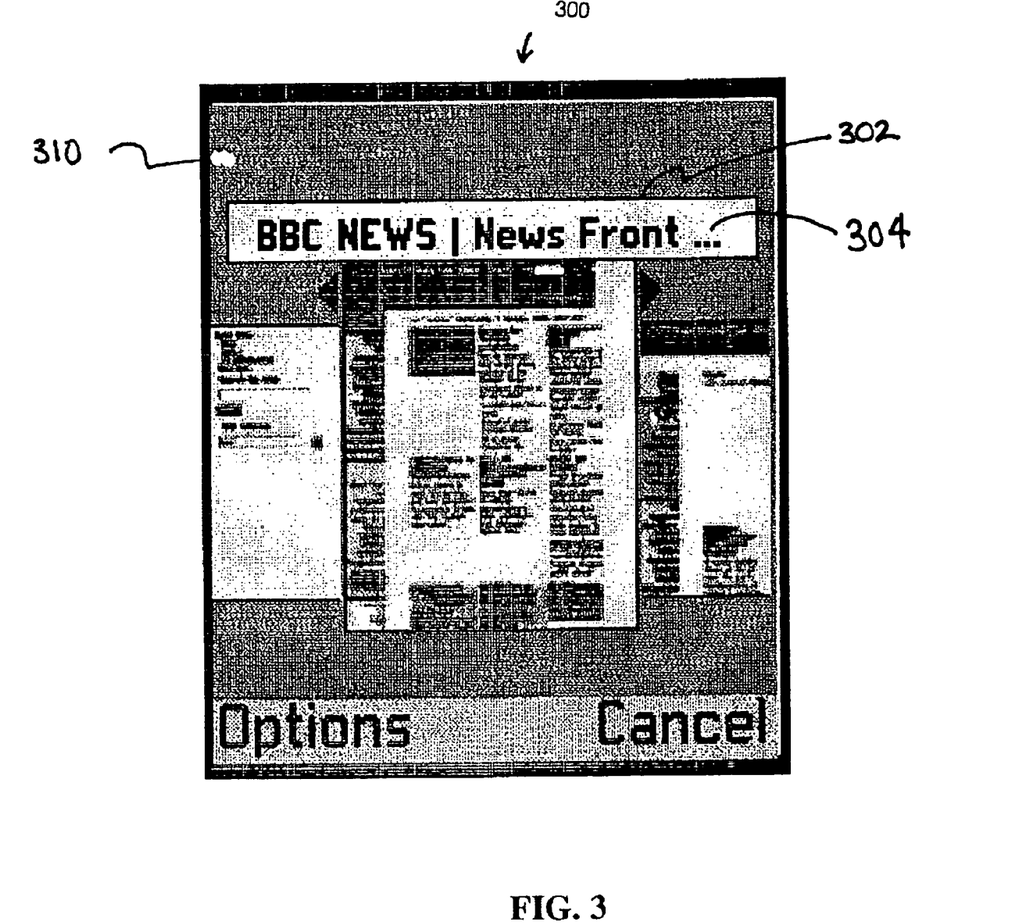
FIG. 3 presents a page with a title "BBC News|NewsFront Page".

The full title of the page 300 shown in FIG. 3 is "BBC News|News Front Page". However, the size of the display 310 does not permit the full title to be displayed in the title area 302 of the display 310. In this example, the title of the page 300 "BBC News|News Front Page" has been determined not to start with the same word as the title of the previous page (not shown). So, in the example of FIG. 3, as many words as possible are displayed in the title section 302, which results in "BBC News|News Front . . . ". The removed word "Page" is indicated by adding ". . . " to the end 304 of the title 302.

Figure 4:
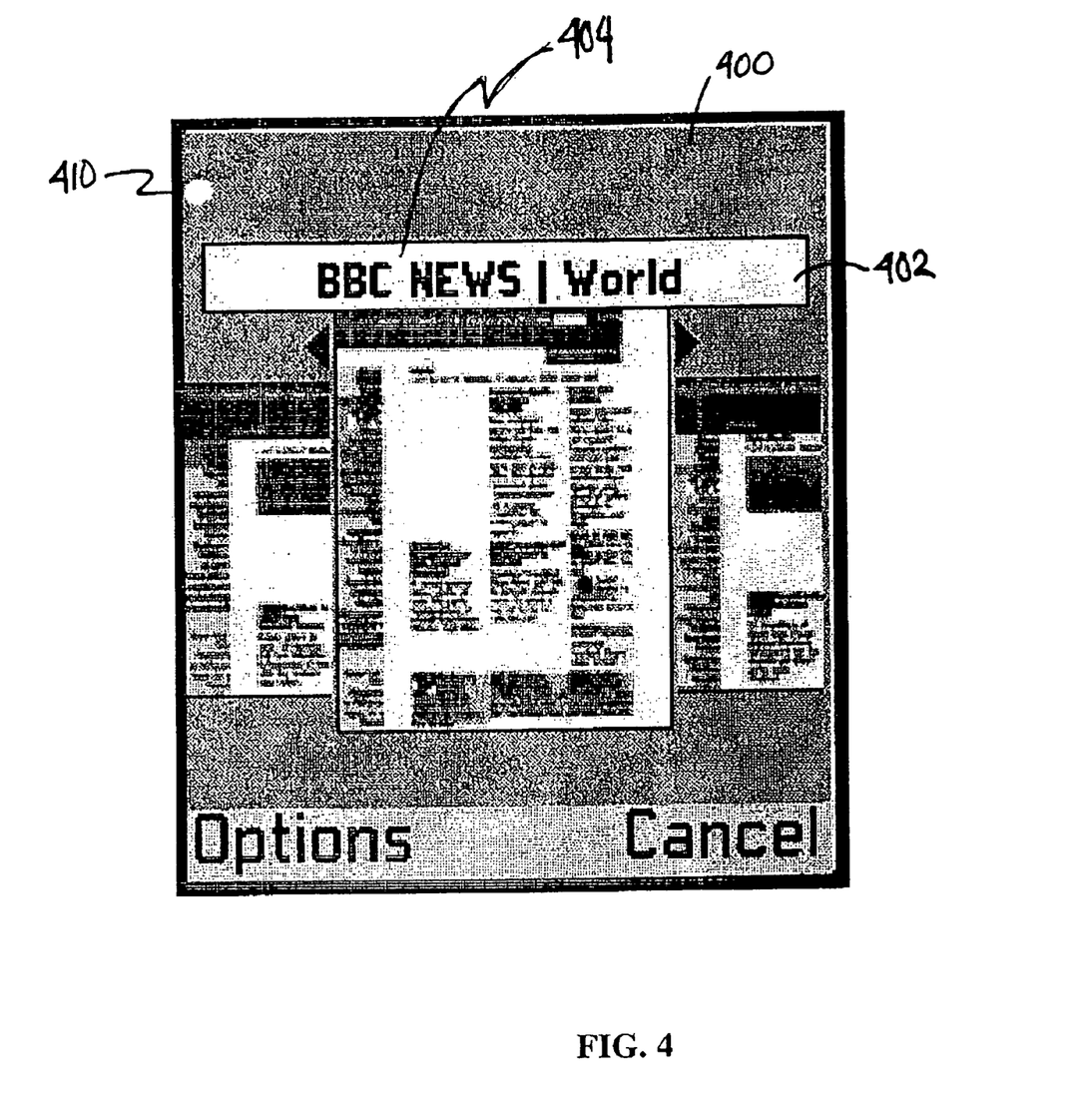
FIG. 4 presents a page with a title "BBC News|World".

In FIG. 4, the user has now navigated to a page 400 entitled "BBC News|World". The displayed title 402, "BBC News|World" to the screen 410, and it is displayed as a whole without truncation.

Figure 5:
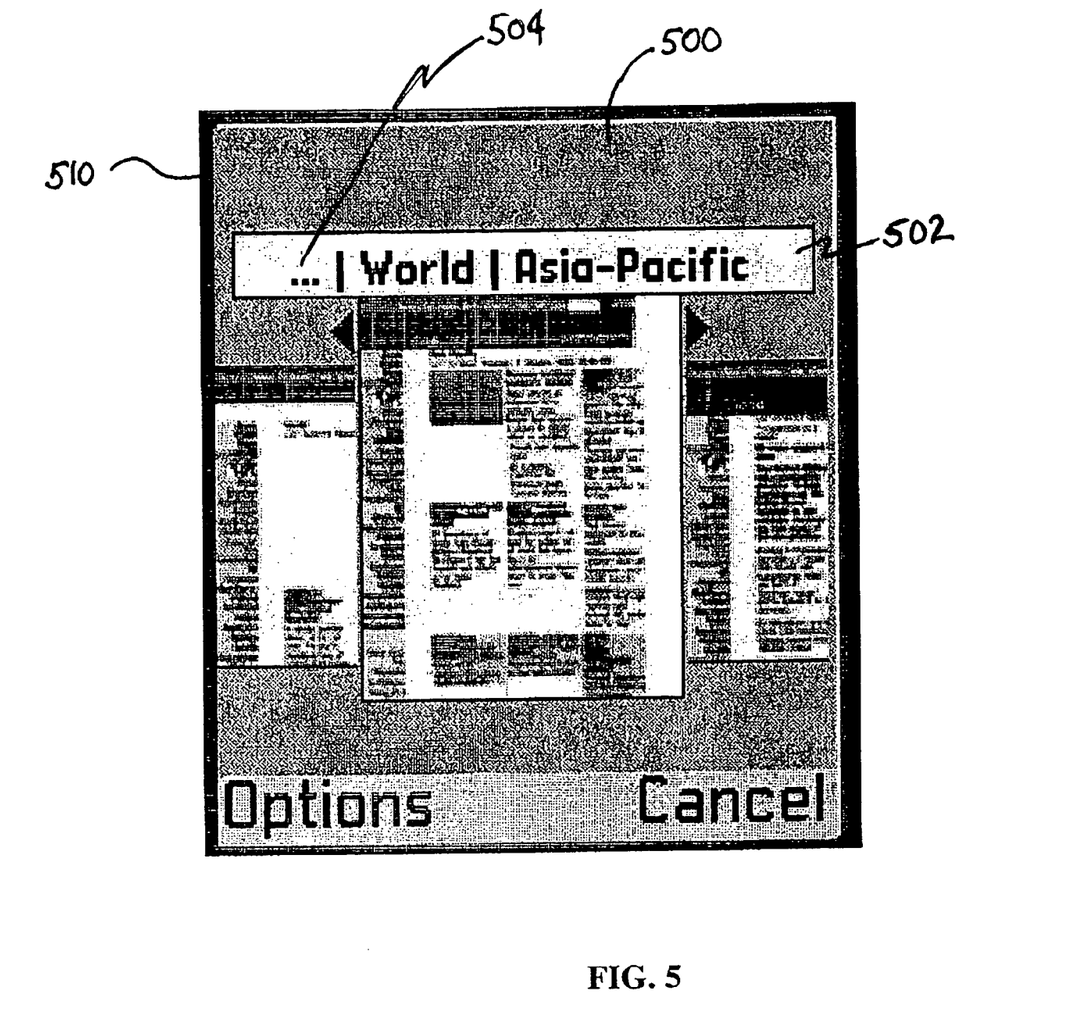
FIG. 5 presents a page with a title "BBC News|World|Asia-Pacific".

Moving to FIG. 5, the user has navigated to the page entitled "BBC NEWS|World|Asia-Pacific". This title is too long to fit into the title area 502 of the display 510. However, the title of the page 500 starts with the same words as the previous title of page 400. In applying the present invention, as many common words as needed are removed from the beginning 504 of the title. In this example, the common words "BBC NEWS" are removed, and this is indicated in the title section 502 of FIG. 5 by adding "..." to the beginning 504 of the title section 502. The resulting shortened title 502 is "... |world|Asia-Pacific".

Figure 6:
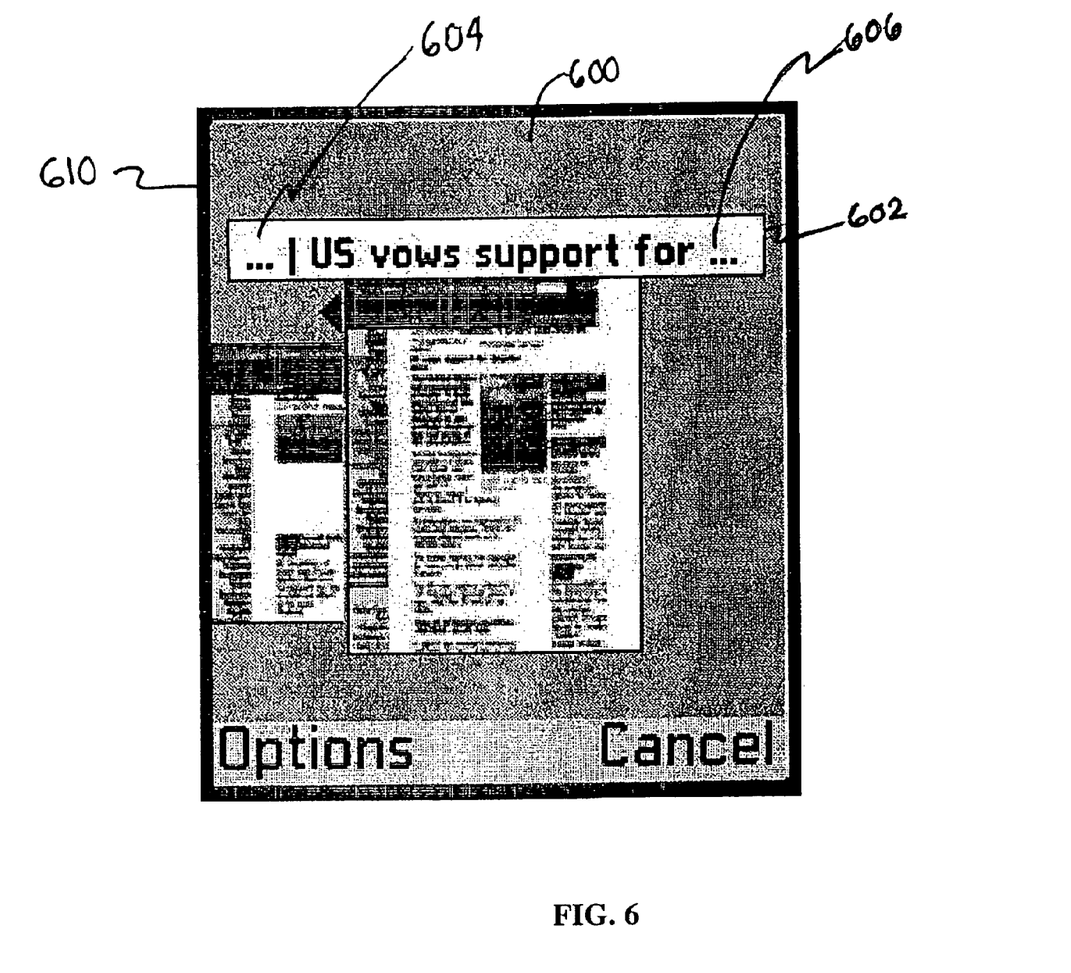
FIG. 6 presents a page with a title "BBC News|World|Asia-Pacific|US vows support for disaster zone".

Referring to FIG. 6, the full title of the page 600 is "BBC NEWS|World|Asia-Pacific|US vows support for disaster zone". This title is too long for the display area 610. In applying the features of the present invention, it is determined that the title of the web page 600 starts with the same words as the previous full title of the web page 500. Thus, as many common words between the beginning portion of the two titles are removed or deleted from the beginning portion of the title of web page 600. This results in the words "BBC NEWS|World|Asia-Pacific" being removed from the beginning 604 of the full title of web page 600. The removed section is indicated by adding "..." to the beginning 604 of the title section 602. As the modified title of the page shown in FIG. 6 still does not fit completely to the screen 610 after removal of the common words from the beginning section 604, additional letters are removed from the end 606 of the title 602 until the title fits in the area 602. The indicators "..." can be added to the end section 606 of the displayed title 602 to indicate the missing or removed letters as soon as the removal takes place or after the title is determined to fit.

Figure 7:
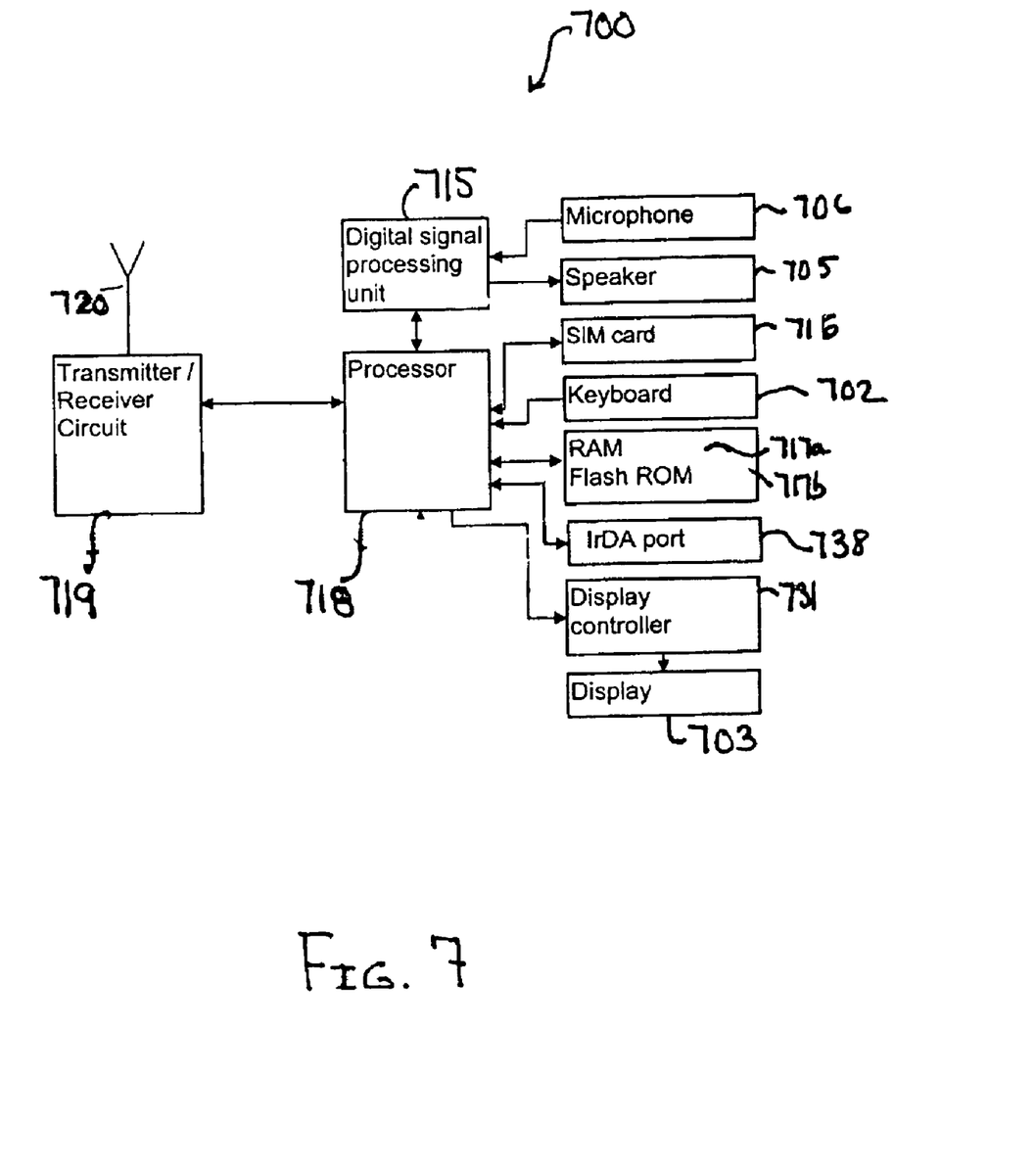
FIG. 7 is a block diagram of one embodiment of a device incorporating features of the present invention.

FIG. 7 schematically illustrates at least some of the components of one embodiment of the device of FIG. 1. In the system 700, the processor 718 controls the communication with the network via the transmitter/receiver circuit 719 and an internal antenna 720.

The microphone 706 transforms speech or other sound into analog signals. The analog signals formed are A/D converted in an A/D converter (not shown) before the speech is encoded in a digital signal processing unit 715 (DSP). The encoded speech signal is transferred to the processor 718. The processor 718 also forms the interface to the peripheral units of the apparatus, including for example, a RAM memory 717a and a Flash ROM memory 717b, a SIM card 716, the display 703 and the keypad 702 (as well as data, power supply, etc.). The digital signal-processing unit 715 speech-decodes the signal, which is transferred from the processor 718 to the speaker 705 via a D/A converter (not shown).

Figure 8:
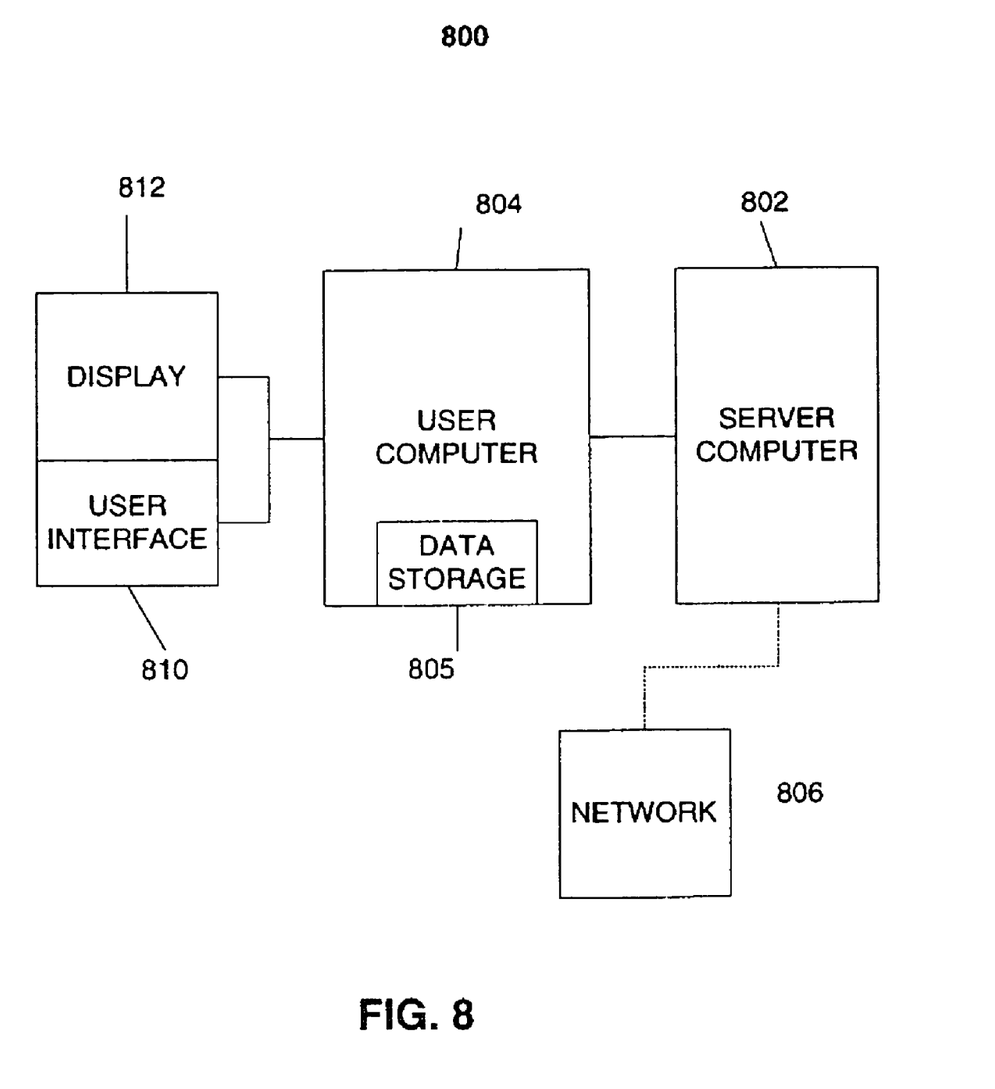
FIG. 8 is a block diagram of one embodiment of an architecture that can be used to practice features of the disclosed embodiments.

The present invention may also include software and computer programs incorporating the process steps and instructions described above that are executed in different computers. In the preferred embodiment, the computers are connected to the Internet. FIG. 8 is a block diagram of one embodiment of a typical apparatus 800 incorporating features of the present invention that may be used to practice the present invention. As shown, a computer system 802 may be linked to another computer system 804, such that the computers 802 and 804 are capable of sending information to each other and receiving information from each other. In one embodiment, computer system 802 could include an origin server or computer adapted to communicate with a network 806, such as for example, the Internet or an Intranet. Computer systems 802 and 804 can be linked together in any conventional manner including a modem, hard wire connection, fiber optic link or such other suitable network connection. Generally, information can be made available to both computer systems 802 and 804 using a communication protocol typically sent over a communication channel or through a dial-up connection on ISDN line. Computers 802 and 804 are generally adapted to utilize program storage devices embodying machine readable program source code which is adapted to cause the computers 802 and 804 to perform the method steps of the present invention. The program storage devices incorporating features of the present invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 802 and 804 may also include a microprocessor for executing stored programs. Computer 802 may include a data storage device 808 on its program storage device for the storage of information and data. The computer program or software incorporating the processes and method steps incorporating features of the present invention may be stored in one or more computers 802 and 804 on an otherwise conventional program storage device. In one embodiment, computers 802 and 804 may include a user interface 810, and a display interface 812 from which features of the present invention can be accessed. The display interface 812 and user interface 810 could be a single interface or comprise separate components and systems. The user interface 808 and the display interface 812 can be adapted to allow the input of queries and commands to the system, as well as present the results of the commands and queries.

The present invention takes into account the titles of the pages already visited. When a users checks several pages at one site, it is not necessary to see the site name at the beginning of the page title each page on the site. Thus, in order to shorten a web page title to fit on the screen, the current title is compared to the previous title. As many common words as needed are removed from the beginning of the title. Missing words are indicted by an indicator at the beginning of the title. If additional words or letters are needed to be removed, they are removed from the end of the title. In this fashion, only the changed part of the title is displayed.

The invention claimed is:

1. A method comprising:
   determining that a title of a current web page does not fit in a title display area of a display;
   removing at least one word from the title of the current page until the title of the current page fits in the title display area wherein removing the at least one word comprises:
      determining, by a processor, that the title of the current web page starts with at least one same word as a title of a previous page; and
      removing at least one word from a beginning portion of the title of the current page that is in common with the title of the previous page; and
      determining that there is at least one common word in between an end portion of the current title and an end portion of the previous title and removing the at least one common word.

2. The method of claim 1 further comprising inserting a predetermined indicator in the beginning portion of the title to indicate the removal of the at least one word.

3. The method of claim 1 further comprising inserting a predetermined indicator to indicate the removed at least one common word.

4. The method of claim 1, wherein removing the at least one word further comprises, removing at least one word from an end portion of the current title until the title fits the display area.

5. The method of claim 4 further comprising inserting a pre-determined indicator in the end portion to indicate the at least one removed word.

6. The method of claim 1 wherein determining that the title of the current web page starts with a same word as a title of a previous page comprises examining the search history of a browser application used by the user to view the web page and identifying a previous web page visited.

7. The method of claim 6, wherein removing the at least one word further comprises determining that a last web page visited is from a same site as the current web page and only comparing words of the titles of the current web page and the previous web page.

8. The method of claim 6, wherein removing the at least one word further comprises
determining that a last web page visited is from a same site as the current web page;
identifying at least one word in the title of the last web page that is common with a word in the title of the current web page;
removing the at least one common word from the beginning of the title of the current page;
determining that a modified title does not fit into the title display area; and
removing at least another common word from the beginning of the title.

9. The method of claim 8, wherein removing the at least one word further comprises:
determining that the modified title does not fit into the title display area;
determining that no more words in common are present in the modified title; and
removing at least one word from an end portion of the modified title or at least one character from an end word.

10. The method of claim 8, wherein removing the at least one word further comprises:
determining that the modified title does not fit into the title display area;
determining that no more words in common are present in the modified title; and
removing at least one character from an end word of the modified title.

11. The method of claim 8, wherein removing the at least one word further comprises:
determining that the modified title does not fit into the title display area;
determining that no more words in common are present in the modified title; and
removing at least one word from an end portion of the modified title.

12. A method comprising:
comparing a current web page title with a previous web page title; and
removing, by a processor, words from the current web page title as needed until the current web page title fits a screen of a display, wherein removing words comprises:
removing as many common words from a beginning of the current web page title as needed; and
determining that there is at least one common word in between an end portion of the current title and an end portion of the previous title and removing the at least one common word.

13. The method of claim 12 further comprising indicating the removed words by adding an indicator to the beginning of the web page title.

14. The method of claim 12 further comprising adding an indicator to the end of the current web page title to indicate any missing words or characters.

15. The method of claim 12, wherein removing words further comprises removing at least one character from an end word of the current web page title until the current web page title fits the screen of the display.

16. The method of claim 15 further comprising adding an indicator to the end of the current web page title to indicate the removed at least one character.

17. A computer program product comprising:
a computer useable medium having computer readable program instructions embodied therein, the computer readable program instructions comprising:
program instructions configured to determine that a title of a current web page does not fit in a title display area of a display; and
program instructions configured to remove at least one word from the title of the current page until the title of the current page fits in the title display area, wherein the program instructions configured to remove the at least one word comprise:
program instructions configured to determine that the title of the current web page starts with at least one same word as a title of a previous page; and
program instructions configured to cause a computer to remove at least one word from a beginning portion of the title of the current page that is in common with the title of the previous page; and
program instructions configured to determine that there is at least one common word in between an end portion of the current title and an end portion of the previous title and remove the at least one common word.

18. The computer program product of claim 17 further comprising program instructions configured to cause a computer to indicate missing words by a predetermined indicator in the beginning portion of the title.

19. An apparatus comprising at least one processor and at least one memory storing computer program code, wherein the at least one memory and stored computer program code are configured to, with the at least one processor, cause the apparatus to at least:
determine that a title of a current web page does not fit in a title display area of a display;
remove at least one word from the title of the current page until the title of the current page fits in the title display area wherein removing the at least one word comprises:
determine, that the title of the current web page starts with at least one same word as a title of a previous page; and
remove at least one word from a beginning portion of the title of the current page that is in common with the title of the previous page; and
determine that there is at least one common word in between an end portion of the current title and an end portion of the previous title and remove the at least one common word.

20. An apparatus comprising at least one processor and at least one memory storing computer program code, wherein the at least one memory and stored computer program code are configured to, with the at least one processor, cause the apparatus to at least:
compare a current web page title with a previous web page title; and remove words from the current web page title as needed until the current web page title fits a screen of a display, wherein removing words comprises:

removing as many common words from a beginning of the current web page title as needed; and determining that there is at least one common word in between an end portion of the current title and an end portion of the previous title and removing the at least one common word.

* * * * *

UNITED STATES PATENT AND TRADEMARK OFFICE
CERTIFICATE OF CORRECTION

| | | |
|---|---|---|
| PATENT NO. | : 7,716,580 B2 | Page 1 of 1 |
| APPLICATION NO. | : 11/171508 | |
| DATED | : May 11, 2010 | |
| INVENTOR(S) | : Roto et al. | |

It is certified that error appears in the above-identified patent and that said Letters Patent is hereby corrected as shown below:

On the Title page,

Item (75) Inventors: "Salla Myllyia" should read --Salla Myllyla--.

Signed and Sealed this
Fourteenth Day of February, 2012

David J. Kappos
*Director of the United States Patent and Trademark Office*